(No Model.)
J. R. RICHARDSON.
ROLLER BEARING.
No. 588,837. Patented Aug. 24, 1897.
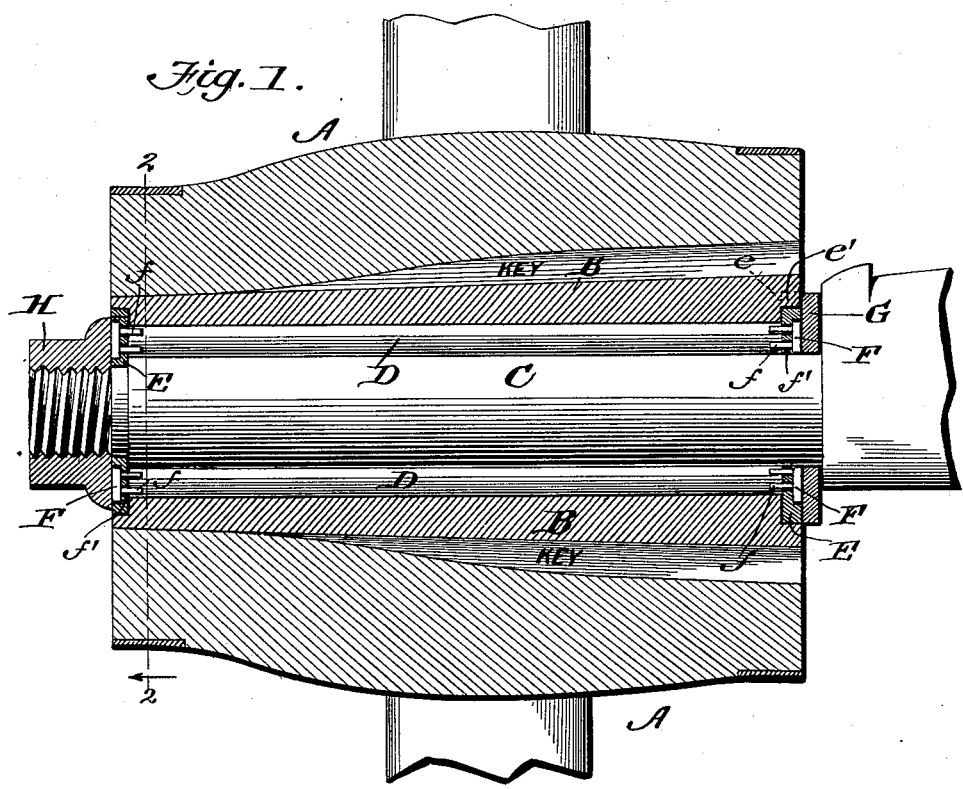
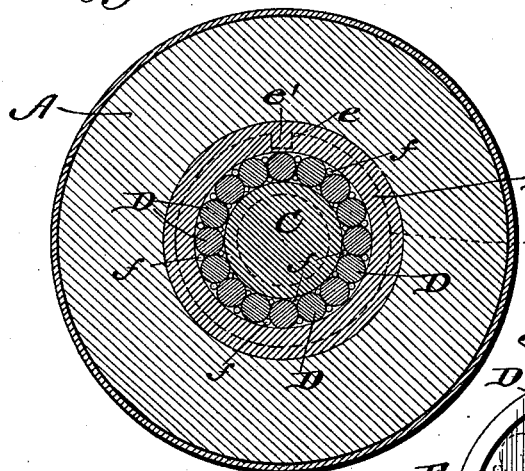
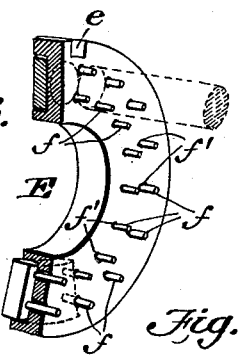
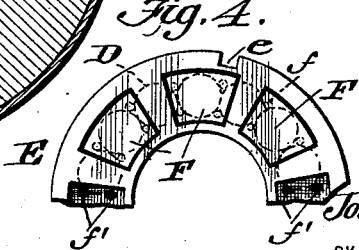
WITNESSES:
INVENTOR
John R. Richardson
BY
ATTORNEYS.

UNITED STATES PATENT OFFICE.

JOHN ROYAL RICHARDSON, OF MADERA, CALIFORNIA, ASSIGNOR OF ONE-THIRD TO WILBUR F. WADDELL, OF SAME PLACE.

ROLLER-BEARING.

SPECIFICATION forming part of Letters Patent No. 588,837, dated August 24, 1897.

Application filed December 7, 1896. Serial No. 614,763. (No model.)

*To all whom it may concern:*

Be it known that I, JOHN ROYAL RICHARDSON, of Madera, in the county of Madera and State of California, have invented a new and useful Improvement in Roller-Bearings, of which the following is a specification.

My invention is an improvement in roller-bearings, and relates particularly to the hub-bearings of wheels intended for vehicles designed to carry heavy loads and in which it is an object to provide a bearing which is both simple in construction and which extends throughout the extent of the spindle portion in order that the weight may be borne uniformly from end to end of such spindle portion and so prevent the breaking down or crushing of the rollers or the boxing in which they operate or the spindle upon which they roll; and the invention consists in a certain novel construction and combination of parts hereinafter described and claimed.

In the drawings, Figure 1 is a longitudinal section of the hub portion of a wheel provided with my improvement and in place on a spindle. Fig. 2 is a cross-sectional view on about line 2 2, Fig. 1; and Fig. 3 is a detail view of one of the collars. Fig. 4 is a detail view of a part of one of the collars, and Fig. 5 is a detail view of one of the plates bearing the projections for separating the rollers.

The hub A is provided with a box B, which box, like the spindle C, may be of ordinary construction except in the particulars hereinafter specified.

The box is so formed relatively to the spindle as to leave a space between the same in which to fit the rollers D. These rollers D extend throughout the length of spindle and box and bear for their full length between the said box and spindle, so that the entire weight is borne upon a roller and is distributed from end to end thereof to an extent equal to the length of the spindle. By this construction it is evident that the weight is not borne by any part of a length less than that of the spindle, and that if the length of spindle and of box be proportioned to the weight to be carried my improved construction will furnish an antifriction-roller bearing which will likewise be proportioned to the weight to be carried by the wheel.

Now it is the practice, in parts of the West particularly, to carry very heavy loads on a wagon, and in such practice it is usual to connect chains to the front of the pole and extending forward therefrom and to hitch several pairs of horses at intervals along such chain and a pair at the pole and to load great quantities of lumber, quartz, grain, &c., upon the wagon, which is transported frequently for many miles over plains and mountainous roads. This produces a great crushing strain upon the bearings, requiring a bearing of unusual strength, and it is also desirable to make the bearings of the simplest construction, because if any accident happens thereto they must be capable of prompt repair by the ordinary teamster.

In my invention I have, as before suggested, sought to provide a bearing which combines both these requisites of strength and simplicity.

At each end of the box I fit a collar E in a rabbet formed in the box, and preferably key them to the box by means of notches $e$ in the collars, receiving projections $e'$ on the box, so the collars will turn with the box and cause the rollers to revolve and turn around the spindle by means of the projections $f$ extending inwardly from the collars and fitting between the rollers.

In the construction shown and as preferred the projections $f$ are made on plates F, which fit outside the collars E, the projections $f$ extending through openings $f'$ in the said collars E and extending between the rollers, as shown.

It will be noticed the plates F are provided with these projections $f$ at their four corners, two of such projections being arranged to fit between the adjacent rollers and being so arranged as to secure said rollers practically in a cage and causing them to turn as the collars are revolved by the turning of the box.

The plates F may be secured to the collars in any desired manner and may be countersunk in the outer faces of said collars, so they will lie flush with such faces and not interfere with the fitting of the shoulder G and cap-nut H snugly against the said collars, as will be understood from Fig. 1.

It will be noticed the projections $f$ are arranged in inner and outer series, the inner series lying nearer the center of the axle than the outer series, so the projections will fit between the adjacent rollers and lie on opposite sides of a circular line drawn through the axes of the group of rollers, as will be understood from Fig. 2.

Having thus described my invention, what I claim, and desire to secure by Letters Patent, is—

The bearing herein described consisting of the spindle, the box thereon, the rollers, a collar at each end of said box, and the separate plates fitted to said collars and having projections which extend between the rollers at the ends thereof, substantially as shown and described.

JOHN ROYAL RICHARDSON.

Witnesses:
B. W. CHILD,
W. F. FOWLER.